United States Patent
Ruider et al.

(10) Patent No.: US 10,436,259 B2
(45) Date of Patent: Oct. 8, 2019

(54) POSITIVELY LOCKING CLUTCH HAVING A RESTORING ELEMENT

(71) Applicant: ZF Friedrichshafen AG, Friedrichshafen (DE)

(72) Inventors: Martin Ruider, Schwarzhofen (DE); Michael Pantke, Friedrichshafen (DE); Johannes Winkler, Tettnang (DE); Matthias Cudok, Ritschenhausen (DE); Martin Hain, Knetzgau (DE); Alexander Markow, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 15/780,444

(22) PCT Filed: Nov. 8, 2016

(86) PCT No.: PCT/EP2016/076899
§ 371 (c)(1),
(2) Date: May 31, 2018

(87) PCT Pub. No.: WO2017/097516
PCT Pub. Date: Jun. 15, 2017

(65) Prior Publication Data
US 2018/0347641 A1    Dec. 6, 2018

(30) Foreign Application Priority Data

Dec. 9, 2015    (DE) .................. 10 2015 224 664

(51) Int. Cl.
*F16D 27/11*    (2006.01)
*F16D 11/14*    (2006.01)
(Continued)

(52) U.S. Cl.
CPC ............ *F16D 27/118* (2013.01); *F16D 11/14* (2013.01); *F16D 27/108* (2013.01)

(58) Field of Classification Search
None
See application file for complete search history.

(56) References Cited

U.S. PATENT DOCUMENTS

| 9,797,470 B2 | 10/2017 | Lorenz |
| 2005/0077137 A1* | 4/2005 | Takashi et al. ........ B60K 17/00 192/38 |

(Continued)

FOREIGN PATENT DOCUMENTS

| DE | 102011007118 | 12/2011 |
| DE | 102013220483 | 6/2014 |

(Continued)

*Primary Examiner* — Colby M Hansen
(74) *Attorney, Agent, or Firm* — Cozen O'Connor

(57) ABSTRACT

An axially actuatable positive engagement clutch which includes an input shaft with an input toothing and an output shaft with an output toothing. An axially displaceable connection element can occupy a meshing position which is located in an actuation path (s) between the open position and the closed position and in which the driving toothing engages with the input toothing or the output toothing for the first time during the transition from the open position into the closed position. An actuation device is configured to displace the connection element from the closed position to the open position, and an elastic return element which applies a restoring force to the connection element in direction of the closed position. The return element has a force/deflection characteristic with a local force maximum (F1) which coincides in the actuation path (s) at least approximately with the meshing position of the connection element.

10 Claims, 3 Drawing Sheets

(51) Int. Cl.
*F16D 27/10* (2006.01)
*F16D 27/118* (2006.01)
*F16D 27/108* (2006.01)

(56) References Cited

U.S. PATENT DOCUMENTS

| | | | | |
|---|---|---|---|---|
| 2006/0243556 | A1* | 11/2006 | Thomas et al. | F16D 27/102 192/84.8 |
| 2010/0140043 | A1* | 6/2010 | Elliot | F16D 11/10 192/69.7 |

FOREIGN PATENT DOCUMENTS

| | | |
|---|---|---|
| DE | 102013205174 | 9/2014 |
| DE | 102015202319 | 8/2015 |
| DE | 102014221107 | 4/2016 |

\* cited by examiner

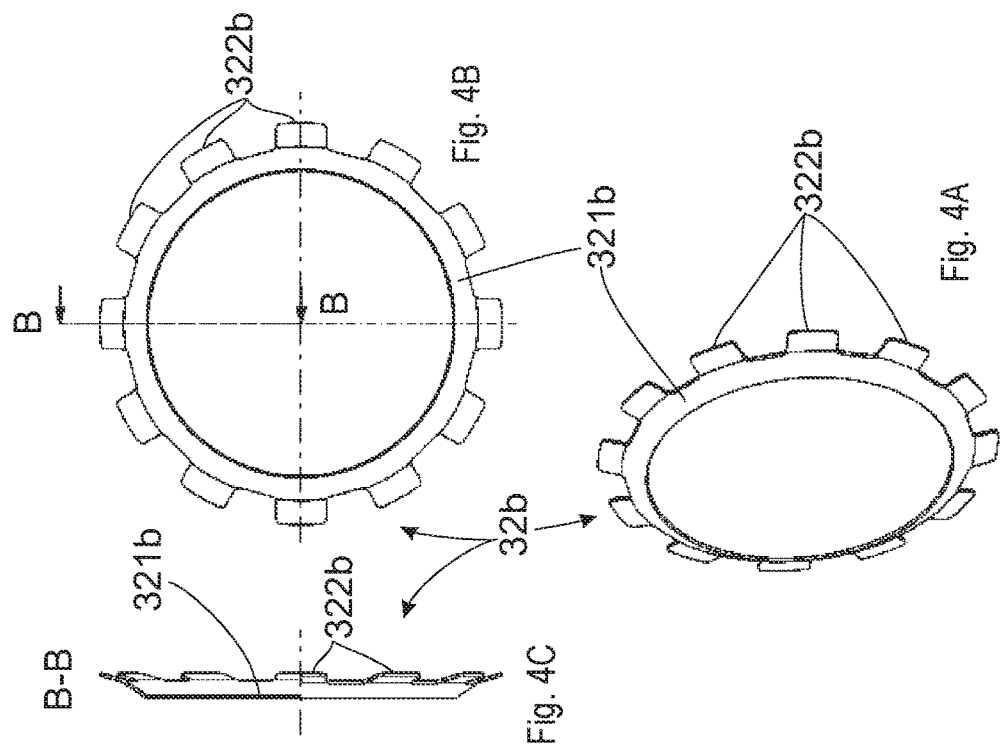
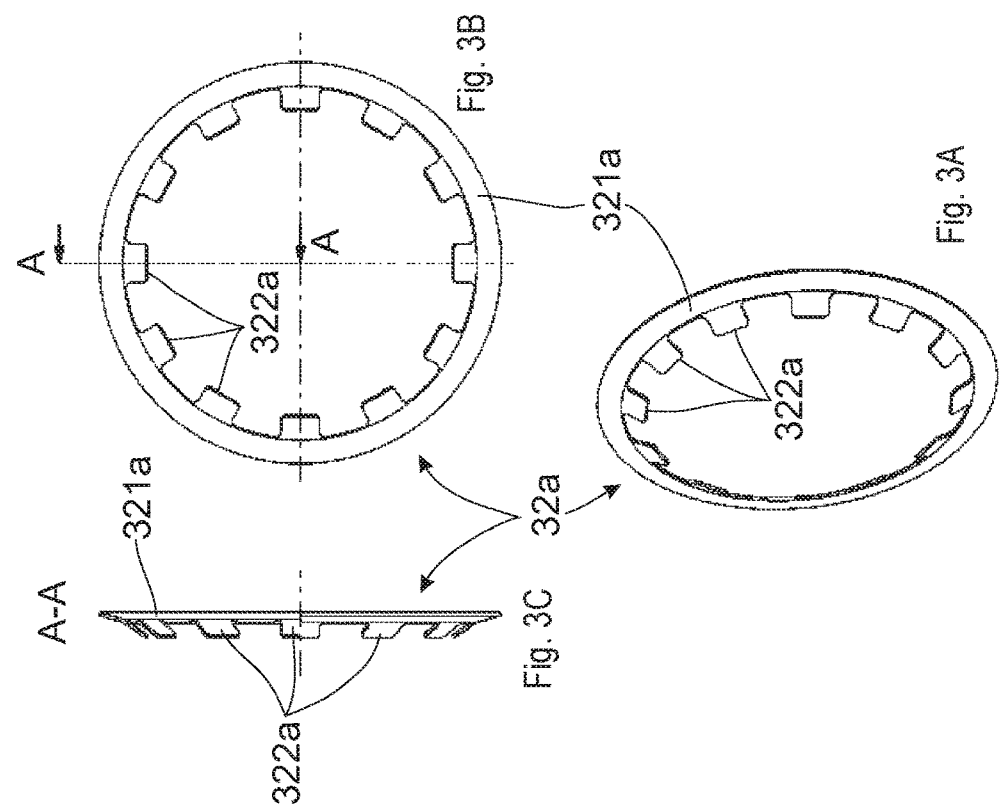

POSITIVELY LOCKING CLUTCH HAVING A RESTORING ELEMENT

PRIORITY CLAIM

This is a U.S. national stage of application No. PCT/EP2016/076899, filed on Nov. 8, 2016. Priority is claimed on the following application: Country: Germany, Application No.: 10 2015 224 664.7, filed: Dec. 9, 2015; the content of which is incorporated herein in its entirety by reference.

FIELD OF THE INVENTION

The present invention is directed to a positive engagement clutch having a return element with a nonlinear force-deflection characteristic.

A generic positive engagement clutch for alternately engaging and disengaging a front axle or a rear axle in an all-wheel drive of a vehicle is already known from DE 10 2013 205 174 A1. The positive engagement clutch is constructed as an electromagnetic, normally-closed dog clutch. In order to eliminate a co-rotation between a toothed input shaft and an output shaft, an electromagnet is energized such that a connection element of the two shafts which is axially displaceable with a magnetic armature and which is likewise provided with teeth is displaced against the action of a return spring or engaging spring in such a way that an existing positive engagement of the teeth in question, and therefore the mutual co-rotation of the shafts, can be canceled. Shifting the connection element back in order to enable a co-rotation of the shafts is carried out solely through the force of the engaging spring.

The problem arises in a positive engagement clutch of this type that the electromagnetic actuation device can carry out an axial stroke in only one of two movement directions substantially independent of an impressed current direction so that a return element formed as a spring element is usually required to enable a movement in the opposite direction. The spring element typically has an approximately linear force characteristic with a positive spring rate with respect to the travel of the magnetic armature. Accordingly, the force of the return spring increases continuously, usually linearly, from the start of stroke to the end of stroke. Therefore, the force characteristic of the electromagnetic linear actuator consequently likewise increases, particularly exponentially, accompanied by a reduction of the air gap remaining between the electromagnet and the magnetic armature. In order to reliably maintain a closed position of the above-mentioned normally-closed clutch, the return spring acts with a predefined preloading force upon the connection element. This preloading force should be as small as possible compared to a producible actuator force in order to achieve the greatest possible dynamics of the clutch. When the clutch is open, the air gap is minimized and there is an equilibrium of forces between the magnetic force and the spring force in this static state.

On the one hand, a reduction in spring force would be desirable in this position in order to increase the efficiency of the positive engagement clutch, and the excitation current of the electromagnet could be reduced simultaneously. But, on the other hand, when the connection element returns to the meshing position of the teeth of the connection element and output shaft, a force which is comparatively large relative to the open position is required to make it possible at a high relative speed for the axially displaceable connection element to mesh uninterruptedly in a tooth space of the mating component and for the clutch to connect even against a limited torque and overcome a possible tooth-to-tooth position of the teeth in question.

An object of the present invention is to provide a positive engagement clutch which remedies the above-mentioned problem.

SUMMARY OF THE INVENTION

Accordingly, an axially actuatable positive engagement clutch is provided which comprises an input shaft with an input toothing and an output shaft with an output toothing. The shafts are arranged coaxial to one another with a common axis of rotation; that is, their axes coincide. The positive engagement clutch further comprises a connection element which is displaceable axially along the axial direction between a closed position of the clutch and an open position of the clutch and which has a driving toothing for cooperating with the input toothing of the input shaft and with the output toothing of the output shaft, in the closed position of the clutch the connection element cooperates with the input shaft and the output shaft and there is a mutual co-rotation of the input shaft and output shaft, and the mutual co-rotation of the input shaft and output shaft is cancelled in an open position of the clutch. The connection element can occupy a meshing position or locking engagement position which is located in an actuation path between the open position and the closed position and in which the driving toothing engages with the input toothing or the output toothing for the first time during the transition from the open position into the closed position. Further, the positive engagement clutch comprises an actuation device which is in operative connection with the connection element and which is configured to displace the connection element from the closed position to the open position. There is further provided an elastic return element which applies a restoring force to the connection element in direction of the closed position.

The positive engagement clutch mentioned above is characterized in that the return element has a force/deflection characteristic with a local force maximum, where this force maximum in the actuation path coincides at least approximately with the meshing position of the connection element. The term "approximately" in this connection has its ordinary and customary meaning which includes reasonably close to, nearly, almost, about, connoting a term of approximation.

By providing a return element formed in this way, a spring force which is reduced relative to the meshing position acts in the open position of the clutch so that the excitation current of the electromagnet can be reduced and, therefore, the efficiency of the positive engagement clutch can be increased. When transitioning into the closed position by passing the meshing position, an axial force which is comparatively large relative to the open position is present at the connection element in order to promote a fast meshing of the teeth in question.

In particular, in a further advantageous manner in order to meet the above-stated object, the force of the return element can be reduced in the open position relative to the force acting at the meshing position. In a yet further advantageous manner, the force of the return element can be reduced in the closed position relative to the force acting at the meshing position. In particular, the force of the return element can be additionally reduced relative to the force acting in the open position. Advantageously, the force/deflection characteristic of the return element can have only a local force maximum between the closed position and the open position.

According to an advantageous embodiment form, the return element can be configured as a Belleville spring with the force/deflection characteristic described above. Belleville springs are obtainable in numerous configurations, are comparatively inexpensive, compact and can be selectively designed and produced with a required spring characteristic through calculation programs. By introducing a required preloading, a Belleville spring of this kind can be installed in the positive engagement clutch such that when an actuator is actuated a defined selected region of its characteristic line is traversed. Further, the Belleville spring can have a circumferentially closed edge area and spring tabs which are oriented radially inward or radially outward. Optionally, the Belleville spring can be offset to further economize on installation space.

In a further development of the invention, the actuation device for electromagnetic actuation is to be formed with an electromagnet and an armature which is displaceable relative to this electromagnet and which is operatively connected to the connection element or forms the connection element.

The positive engagement clutch can preferably be formed as a disconnect clutch in a powertrain in a motor vehicle for transmitting a vehicle drive torque and for use therein.

BRIEF DESCRIPTION OF THE DRAWINGS

The invention is described in detail with reference to the drawings in which:

FIG. 3A is a perspective view of a Belleville spring with spring tabs facing radially inward;

FIG. 3B is a plan view of the Belleville spring of FIG. 3A;

FIG. 3C is a side view of the Belleville spring of FIG. 3A;

FIG. 4A is a perspective view of a Belleville spring with spring tabs facing radially outward;

FIG. 4B is a plan view of the Belleville spring of FIG. 4A; and

FIG. 4C is a side view of the Belleville spring of FIG. 3A.

DETAILED DESCRIPTION OF THE PRESENTLY PREFERRED EMBODIMENTS

Figure 1:
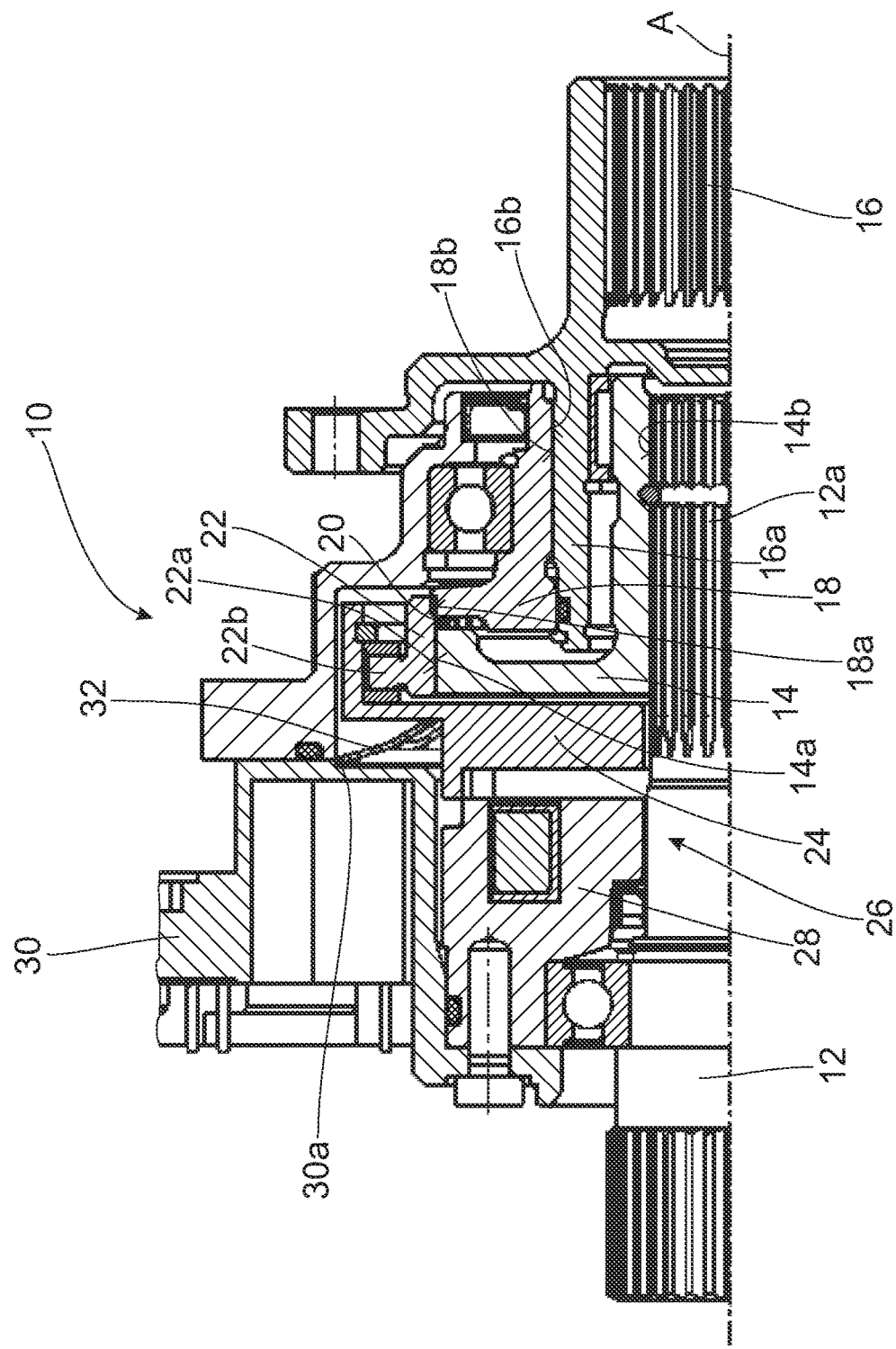
FIG. 1 is a sectional view of a positive engagement clutch which can be actuated electromagnetically.

FIG. 1 shows a positive engagement clutch 10 which is arranged in a powertrain of a hybrid vehicle, which operates functionally as a disconnect clutch between two drive units, not shown, particularly between an internal combustion engine and an electric machine and by means of which, in the closed state, a drive torque of the internal combustion engine can be introduced into a gear changing transmission, also not shown. To start the internal combustion engine, a torque can be transmitted form the electric machine to the internal combustion engine also when the clutch 10 is closed. The positive engagement clutch 10 can be arranged inside the electric machine so as to be particularly economical with respect to the installation space.

The positive engagement clutch 10 has an input shaft 12, a toothed disk 14 with an outer input toothing 14a being arranged at the end region of the input shaft 12 located inside of the clutch. An output shaft 16 which is constructed in this instance as a hollow shaft is supported coaxial to the input shaft 12 and comprises a toothed disk 18 with an outer output toothing 18a at the end region facing the input shaft 12 at an axial projection 16a surrounding the input shaft 12. The axes A of the shafts coincide and also simultaneously form a clutch axis A. In the present case, the shafts 12, 16 are arranged so as to be axially adjacent. Alternatively, or in addition, shafts 12, 16 can also be supported concentric to one another.

The two toothed disks 14, 18 are secured, respectively, by further toothings 14b, 18b formed at their inner circumference such that they are fixed with respect to relative rotation and also fixed with respect to axial displacement on the shafts 12, 16 by toothings 12a, 16b formed at the latter. Input toothing 14a and output toothing 18a are arranged in each instance on a common pitch circle diameter of the toothed disks 14, 18. The toothed disks are separated axially by a gap 20 and can cooperate with a connection element 22 which is located radially outside of the gap 20 and which is formed as a shift sleeve. To this end, the connection element 22 has an inner driving toothing 22a which is formed corresponding to input toothing 14a of input shaft 12 and output toothing 18a of output shaft 16 and by which the connection element 22 is guided so as to be axially displaceable along axis direction A between a closed position and an open position of the clutch 10.

In the closed position of the clutch, as is shown in FIG. 1, the connection element 22 is accordingly engaged with the input shaft 12 and with the output shaft 16 via the toothed disks 14, 18 such that there is a mutual co-rotation of the input shaft 12 and output shaft 16. For adopting the open position of the clutch 10, the connection element 22 can be shifted toward the left-hand side in FIG. 1, and the engagement of the driving toothing 22a with the output toothing 18a is canceled and, accordingly, the mutual co-rotation of the input shaft 12 and output shaft 16 is cancelled.

To execute this displacing movement, the connection element 22 is secured to a radial flange 22b in a central receiving area of an axially displaceable, pot-shaped magnetic armature 24 which is a component part of an electromagnetic actuation device 26 or, more accurately, of a monostable electromagnetic actuator 26. To this end, the magnetic armature 24 is produced from a ferromagnetic material, for example, a steel material. Through the magnetic field of an annular electromagnet 28 which is arranged axially adjacent to the magnetic armature 24 so as to be fixed to the housing, the magnetic armature 24 can be moved axially toward this electromagnet 28. In order to enable a restoring movement of the magnetic armature 24 when the electromagnet 28 is not energized, a flexible return element 32 with a spring characteristic to be further explained hereinafter (FIG. 2) in the form of a Belleville spring is inserted between the magnetic armature 24 and a supporting region 30a formed at a housing part 30. The return element 32 accordingly loads the connection element 22 in direction of the closed position of clutch 10. Accordingly, it will be seen that the positive engagement clutch 10 is constructed in the present case as a normally-closed clutch.

Two Belleville springs 32a, 32b to be used as return springs are shown by way of example from multiple viewpoints in FIGS. 3A, 3B, 3C and 4A, 4B, 4C. The Belleville springs 32a, b have, respectively, a circumferentially closed edge area 321a, 321b and spring tabs 322a, 322b which protrude from the latter and which can be oriented radially inward according to FIG. 3 or radially outward according to FIG. 4. Further, the Belleville springs can also be offset in axial direction.

Figure 2:
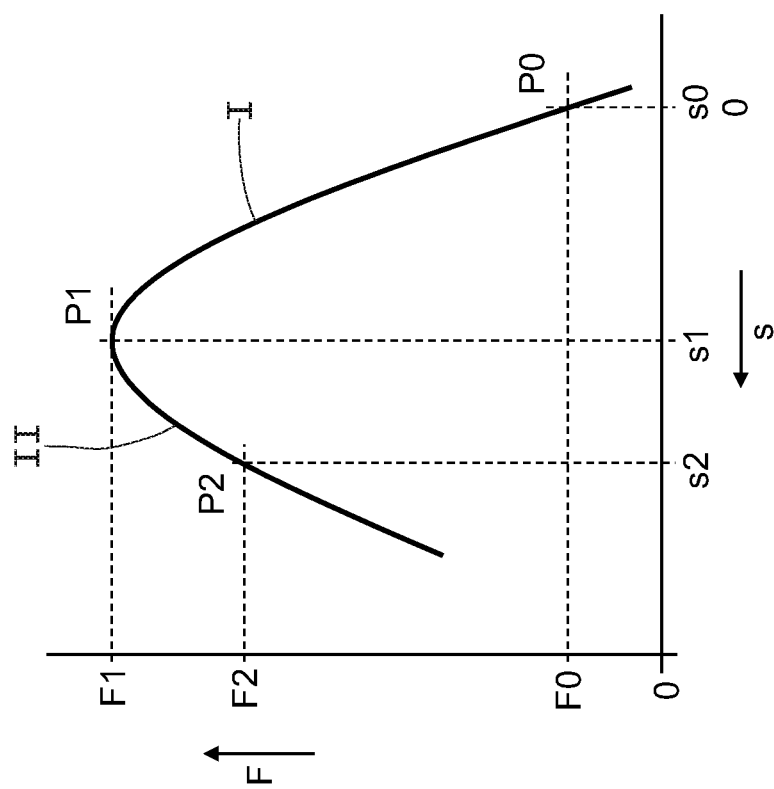
FIG. 2 is a force/deflection characteristic of a Belleville spring.

The Belleville spring 32 serving as return element 32 is formed in the present instance such that its force/deflection characteristic has a local force maximum at position P1 as is shown schematically in FIG. 2. Accordingly, the spring characteristic shown in FIG. 2 exhibits a nonlinear curve of the associated spring force F over a deformation region or over path s.

Consistent with the function of the positive engagement clutch 10 shown in FIG. 1, the spring characteristic is depicted in such a way that the path s on the abscissa coincides with the movement direction of the magnetic armature 26, i.e., with its travel, when the electromagnet 28 is energized. Consequently, the spring characteristic has a first branch or portion I with a positive spring rate in which an increasing deformation or compression of the Belleville spring 32 along path s is accompanied by a force F which likewise increases in a nonlinear manner up to the maximum at P1 and an adjoining, second branch or portion II with a negative spring rate at which a further deformation or compression of the Belleville spring 32 is accompanied by a decreasing force F.

In the closed position of the positive engagement clutch 10 shown in FIG. 1, the Belleville spring 32 is already employed with a slight preloading between its supporting region 30a and the magnetic armature 26. In the spring characteristic, point P0 with path S0=0 and force F0, whose amount is greater than zero owing to the above-mentioned preloading, corresponds to the above-mentioned state. Further, Belleville spring 32 is inserted such that in point P1 the force maximum F1 occupied in s1 is located approximately at a position in which the driving toothing 22a of the connection element 22 engages with the output toothing 18a of the output shaft 16 for the first time during the transition from the open position to the closed position. Accordingly, the force maximum P1 of the Belleville spring 23 coincides on the actuation path at least approximately with the meshing position of the connection element 22.

When the electromagnet 28 is energized, the magnetic armature 26 can be displaced with the connection element 22 toward the left-hand side proceeding from P0 and passing force maximum F1 in P1, and the open position of the clutch is finally reached with end position P2. Since the associated force F2 is reduced relative to F1 in this case, the effective magnetic force can be correspondingly decreased by reducing an electrical excitation of the electromagnet 28. It can be seen further that force F2 is appreciably greater than preloading force F0. In this state P2, the co-rotation between the input shaft 12 and the output shaft 16 is cancelled.

If this co-rotation is restored, the electromagnet 28 is deenergized so that the magnetic armature 26 with the connection element 22 can move again toward the right-hand side proceeding from P2 under the influence of the return spring 32. In so doing, the return spring 32 is relaxed accompanied by a simultaneous increase in force up to the maximum value F1 in P1. As a result of the defined installation of the Belleville spring 32 described in the preceding, the driving element 22 can develop a maximum force relative to the toothed disk 18 so as to enable a prompt meshing when reaching a tooth-gap position and to suppress a mutual clashing of the relevant toothings 22a, 18a comparatively quickly, and the positive engagement clutch 10 can be closed relatively quickly.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An axially actuatable positive engagement clutch comprising:
    an input shaft having an input toothing and an output shaft with an output toothing, the input and output shafts arranged coaxial to one another with a common axis of rotation (A);
    a connection element displaceable axially along the axis (A) between a closed position of the clutch and an open position of the clutch and further comprising a driving toothing for cooperating with the input toothing of the input shaft and with the output toothing of the output shaft, and wherein, in the closed position of the clutch, the connection element cooperates with the input shaft and the output shaft so as to result in a mutual co-rotation of the input shaft and output shaft, and wherein the mutual co-rotation of the input shaft and output shaft is cancelled in an open position of the clutch;
    the connection element occupying a meshing position located in an actuation path between the open position and the closed position and in which meshing position the driving toothing is engaging with the input toothing or the output toothing for the first time during the transition from the open position into the closed position,
    an actuation device operatively connected to the connection element and configured to displace the connection element from the closed position to the open position; and
    an elastic return element applying a restoring force to the connection element in direction of the closed position, the return element having a force/deflection characteristic with a local force maximum (F1), and wherein the force maximum (F1) in the actuation path coincides at least approximately with the meshing position of the connection element.

2. The positive engagement clutch according to claim 1, wherein the force (F2) of the return element is reduced in the open position relative to the force (F1) acting at the meshing position (P1).

3. The positive engagement clutch according to claim 1, wherein the force (F0) of the return element is reduced in the closed position (P0) relative to the force (F1) acting at the meshing position (P1).

4. The positive engagement clutch according to claim 1, wherein the force (F0) of the return element in the closed position (P0) is reduced relative to the force (F2) acting in the open position (P2).

5. The positive engagement clutch according to claim 1, wherein the force/deflection characteristic of the return element has only a local force maximum between the closed position and the open position.

6. The positive engagement clutch according to claim 1, wherein the return element is a Belleville spring.

7. The positive engagement clutch according to claim 6, wherein the Belleville spring has a circumferentially closed edge area and spring tabs which are oriented radially inward or radially outward.

8. The positive engagement clutch according to claim 6, wherein the Belleville spring is constructed so as to be angulated.

9. The positive engagement clutch according to claim 1, wherein the actuation device is configured for electromagnetic actuation and comprises an electromagnet and a magnetic armature displaceable relative to the electromagnet and which is operatively connected to the connection element or forms the connection element.

10. The positive engagement clutch according to claim 1, wherein the positive engagement clutch is constructed as a disconnect clutch in a powertrain in a motor vehicle for transmitting a vehicle drive torque.

\* \* \* \* \*